United States Patent
Chien

(10) Patent No.: US 7,464,290 B2
(45) Date of Patent: Dec. 9, 2008

(54) DATA STORAGE SYSTEM AND MANAGING METHOD THEREOF

(75) Inventor: Hung-Ming Chien, Hsinchu (TW)

(73) Assignee: Promise Technology, Inc., Hsin-Chu (TW)

( * ) Notice: Subject to any disclaimer, the term of this patent is extended or adjusted under 35 U.S.C. 154(b) by 526 days.

(21) Appl. No.: 11/319,664

(22) Filed: Dec. 29, 2005

(65) Prior Publication Data
US 2006/0271818 A1    Nov. 30, 2006

(30) Foreign Application Priority Data
May 30, 2005    (TW) .............................. 94117663 A

(51) Int. Cl.
*G06F 11/00* (2006.01)
(52) U.S. Cl. ........................................................ 714/7
(58) Field of Classification Search .................. 714/5–8
See application file for complete search history.

(56) References Cited

U.S. PATENT DOCUMENTS 6,598,174 B1 *  7/2003  Parks et al. ..................... 714/6
7,313,721 B2 * 12/2007  Ashmore ......................... 714/7
2002/0162057 A1 * 10/2002  Talagala ....................... 714/54
2006/0015771 A1 *  1/2006  Van Gundy et al. ............. 714/7

* cited by examiner

*Primary Examiner*—Bryce P Bonzo
(74) *Attorney, Agent, or Firm*—Birch, Stewart, Kolasch & Birch, LLP

(57) ABSTRACT

A method for managing a data storage system is provided. The data storage system includes a primary storage device and a spare storage device. The primary storage device includes a plurality of sections. The method first judges whether the primary storage device conforms to a first standard. Once the judging result is NO, the primary storage device is replaced with the spare storage device. The method then scans the primary storage device, checks which sections are failed in the primary storage device, and locates the failed sections. Then, the method repairs the failed sections that can be repaired and judges whether the primary storage device conforms to a second standard. If the primary storage device conforms to the second standard, the method sets the primary storage device as a new spare storage device.

14 Claims, 4 Drawing Sheets

DATA STORAGE SYSTEM AND MANAGING METHOD THEREOF

BACKGROUND OF THE INVENTION

1. Field of the Invention

This invention relates to data storage systems. More specifically, the invention is related to data storage systems including spare storage devices.

2. Description of the Prior Art

The demand for data storage protection and capacity in computer networking environments increases substantially each year. Internet use and data-intensive applications, such as multimedia and online transaction processes, have contributed to the increased demand for data storage capacity. Undoubtedly, the reliability of data storage systems is a significant issue as well.

To prevent important data from being damaged when a data storage system fails, most data storage systems has built-in preventing mechanism.

A conservative preventing mechanism discards a primary storage device once a few abnormalities occur in the primary storage device and replace the primary storage device with a spare storage device. In this way, the possibility of data being damaged is decreased. However, users must pay more maintenance fee. On the other hand, an aggressive preventing mechanism discards a primary storage device until more abnormalities occur in the primary storage device. By contrast, an aggressive preventing mechanism saves maintenance fee at the expense of reliability of data storage systems. Accordingly, adopting which preventing mechanism has been a bothersome problem for users.

SUMMARY OF THE INVENTION

To solve aforementioned problems, this invention provides a data storage system and a managing method thereof. When a primary storage device of one data storage system is detected as abnormal, this invention first copies the data stored in the primary storage device into a spare storage device such that the primary storage device can be replaced with the spare storage device. Then, the data storage system and the managing method thereof according to this invention scan all the sections in the primary storage device and try to repair the failed sections. If most sections in the primary storage device are still usable after being repaired, this invention sets the primary storage device as a new spare storage device instead of directly discarding the primary storage device. Thus, this invention can considerably reduce the resources and the maintenance fee for data storage systems.

The first preferred embodiment according to this invention is a data storage system. The data storage system includes a primary storage device, a spare storage device, a judging module, a replacing module, an examining module, and a repairing module. The primary storage device includes a plurality of sections for storing data. The judging module is used for judging whether the primary storage device conforms to a first standard. The replacing module is operated by the judging module. Once the judging result of the judging module is NO, the replacing module replaces the primary storage device with the spare storage device. The examining module is used for scanning the primary storage device, checking which sections are failed in the primary storage device, and locating the failed sections. The repairing module is used for checking whether the failed sections located by the examining module can be repaired. If there is any failed section that can be repaired, the repairing module repairs the failed sections that can be repaired and then judges whether the primary storage device conforms to a second standard. If the primary storage device conforms to the second standard, the repairing module sets the primary storage device as a new spare storage device.

The second preferred embodiment according to this invention is a managing method for a data storage system. The data storage system includes a primary storage device and a spare storage device. The primary storage device includes a plurality of sections. The method first judges whether the primary storage device conforms to a first standard. Once the judging result is NO, the primary storage device is replaced with the spare storage device. The method then scans the primary storage device, checks which sections are failed in the primary storage device, and locates the failed sections. Then, the method repairs the failed sections that can be repaired and judges whether the primary storage device conforms to a second standard. If the primary storage device conforms to the second standard, the method sets the primary storage device as a new spare storage device.

The advantage and spirit of the invention may be understood by the following recitations together with the appended drawings.

BRIEF DESCRIPTION OF THE APPENDED DRAWINGS

DETAILED DESCRIPTION OF THE INVENTION

This invention provides a data storage system and a managing method thereof.

Figure 1A:
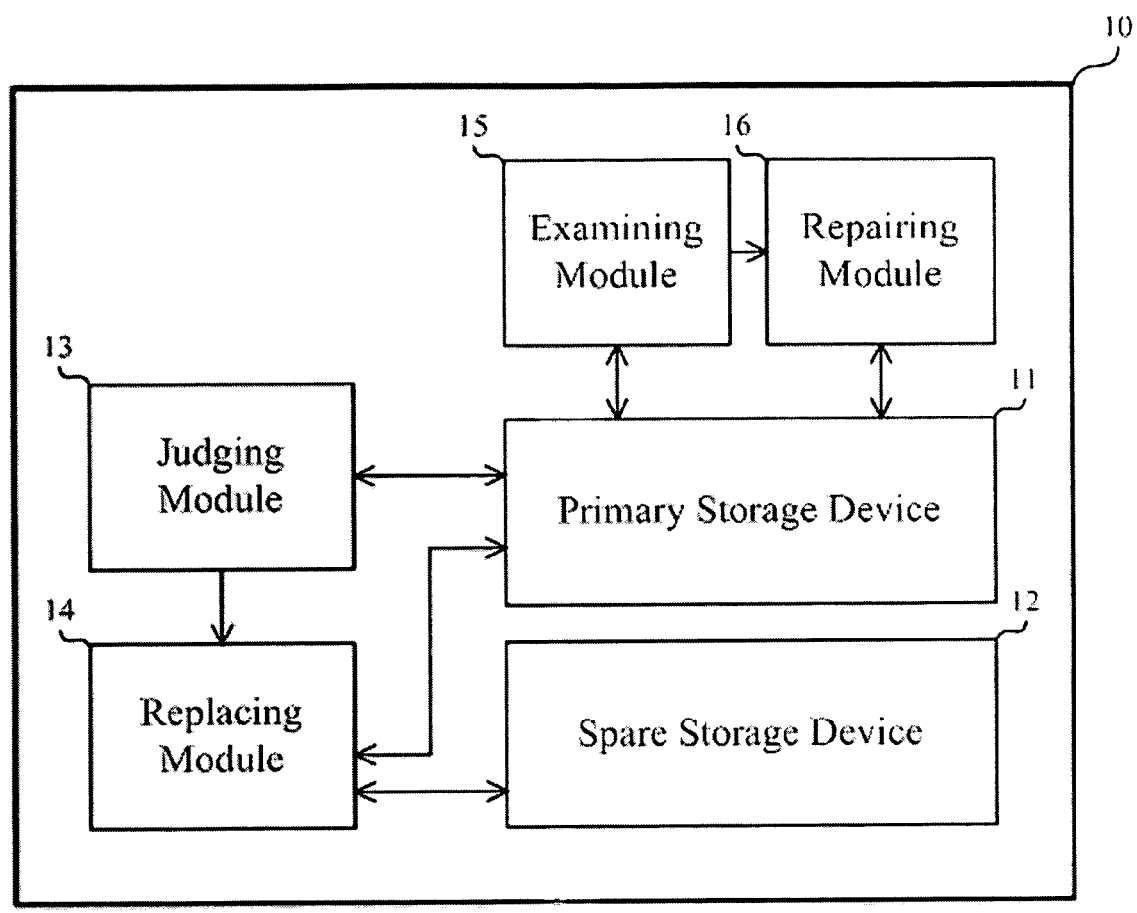
FIG. 1A is the block diagram of the data storage system according to the first preferred embodiment of this invention.

Please refer to FIG. 1A. The data storage system of the first preferred embodiment according to this invention is disclosed in FIG. 1A. The data storage system 10 includes a primary storage device 11, a spare storage device 12, a judging module 13, a replacing module 14, an examining module 15, and a repairing module 16. The primary storage device 11 and the spare storage device 12 can both be disk drives.

The primary storage device 11 includes a plurality of sections for storing data. The judging module 13 can be operated constantly or in response to a user command. The judging module 13 is used for judging whether the primary storage device 11 conforms to a first standard. The replacing module 14 is operated by the judging module 13. Once the judging result of the judging module 13 is NO, the replacing module 14 replaces the primary storage device 11 with the spare storage device 12. The examining module 15 is used for scanning the primary storage device 11, checking which sections are failed in the primary storage device 11, and locating the failed sections. After the replacing module 14 replaces the primary storage device 11 with the spare storage device 12, the examining module 15 subsequently scans the primary storage device 11 and checks whether the failed sections located by the examining module 15 can be repaired. If there is any failed section that can be repaired, the repairing module 16 repairs the failed sections that can be repaired and then judges whether the primary storage device 11 conforms to a second standard. If the primary storage device 11 conforms to the second standard, the repairing module 16 sets the primary storage device 11 as a new spare storage device. If the primary storage device 11 does not conform to the second standard, the repairing module 16 sets the primary storage device 11 as a new spare storage device.

Figure 1B:
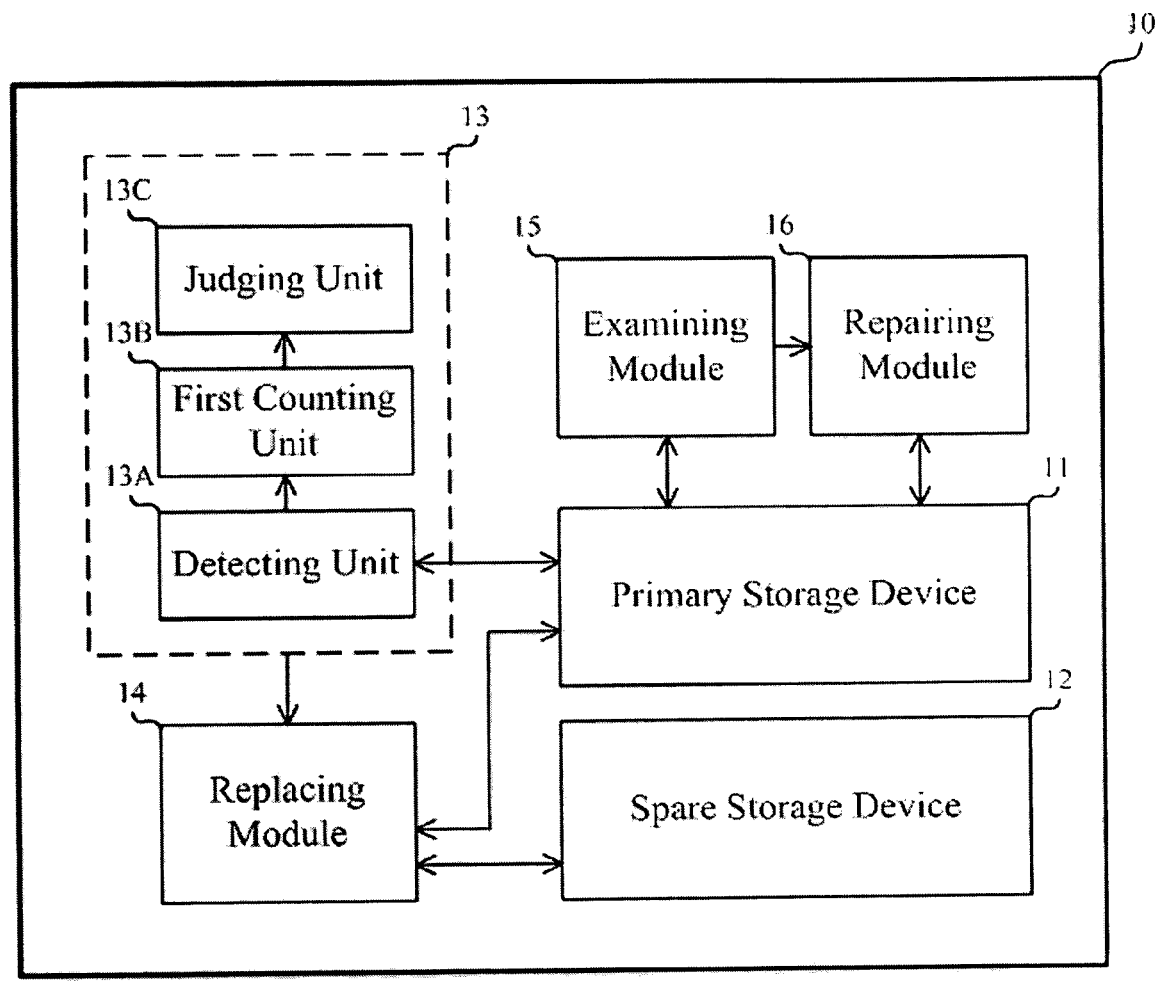
FIG. 1B is a detailed embodiment of the first preferred embodiment shown in FIG. 1A.

As shown in FIG. 1B, the judging module 13 can include a detecting unit 13A, a first counting unit 13B, and a judging unit 13C. The detecting unit is used for detecting whether an abnormality occurs in any section of the primary storage device 11. The first counting unit 13B is used for counting the number of abnormalities detected by the detecting unit 13A. The judging unit 13C is used for judging whether number of abnormalities counted by the first counting unit 13B is larger than a first predetermined threshold. In the preferred embodiment shown in FIG. 1B, the number of abnormalities in the primary storage device 11 is set as the judging basis of the first standard.

Similarly, when the repairing module 16 judges whether the primary storage device 11 conforms to a second standard, a second counting unit (not shown in the figures) can be used. The second counting unit counts the number of sections that cannot be repaired and judging whether the number of sections that cannot be repaired is smaller than a second predetermined threshold. If the number of sections that cannot be repaired is smaller than the second predetermined threshold, the primary storage device 11 is considered as conforming to the second standard. Thus, the repairing module 16 can set the primary storage device 11 as a new spare storage device. On the contrary, if the number of sections that cannot be repaired is larger than the second predetermined threshold, the repairing module 16 sets the primary storage device 11 as a new spare storage device.

In actual applications, some data storage systems synchronously store data in the primary storage device 11 and the spare storage device 12 at the beginning. In this case, the replacing module 14 can directly replace the primary storage device 11 with the spare storage device 12 and doesn't need to copy the data form the primary storage device 11 into the spare storage device 12 first. On the other side, data storage system may not have aforementioned synchronously storing function. In that case, the replacing module 14 must first copy the data stored in the primary storage device 11 into the spare storage device 12 before replacing the primary storage device 11.

In actual applications, there can be a variety of repairing methods for the repairing module 16 to repair the primary storage device 11. Many data storage systems have self-repairing abilities. If the primary storage device 11 has self-repairing abilities, the repairing module 16 can also start the self-repairing mechanism to repair the failed sections.

In actual applications, if the repairing module 16 judges the primary storage device 11 as a failed storage device, the data storage system 10 may further add a new spare storage device.

Figure 2A:
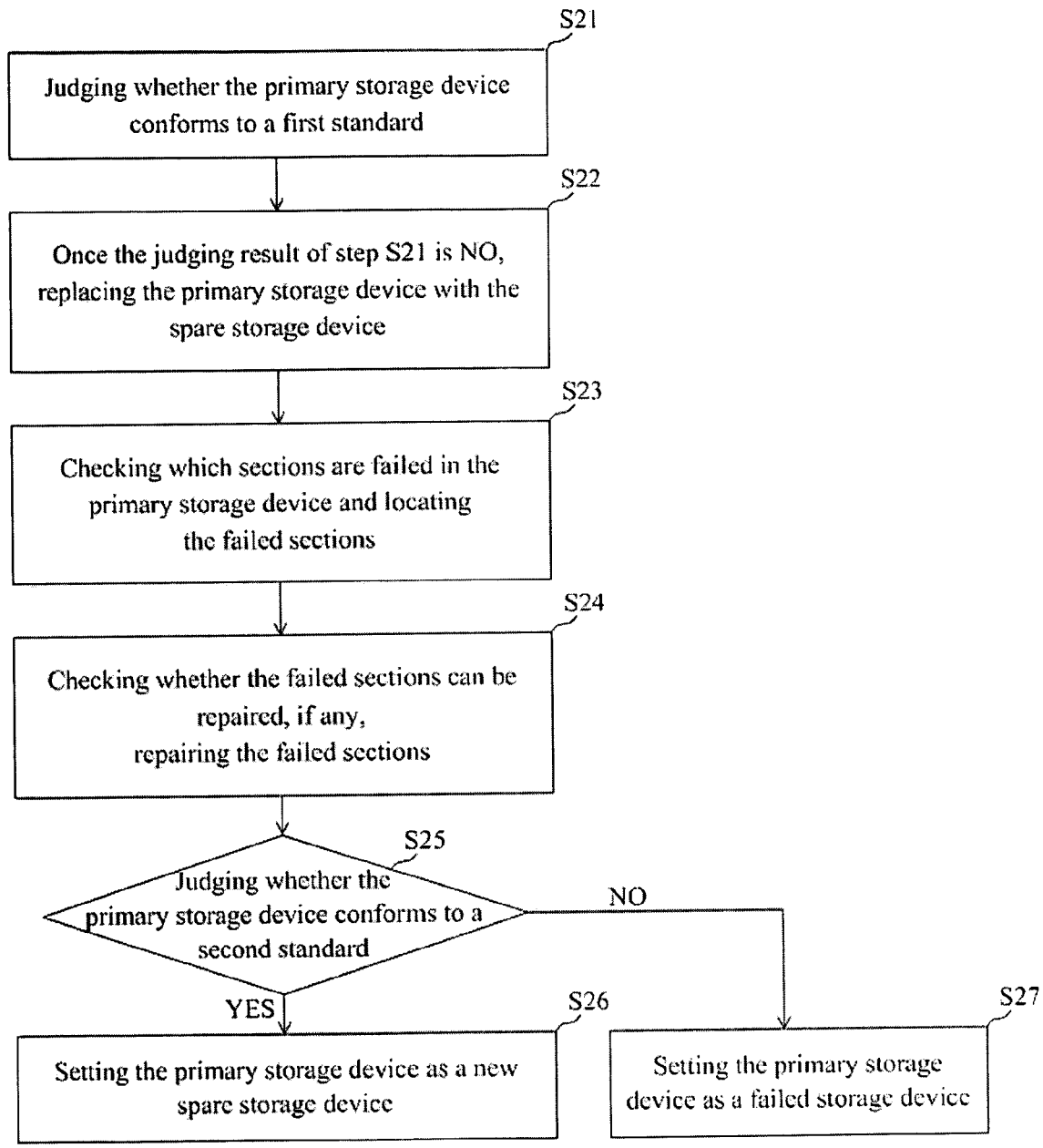
FIG. 2A is the flow chart of the managing method according to the second preferred embodiment of this invention.

The second preferred embodiment according to this invention is a managing method for a data storage system. The data storage system includes a primary storage device and a spare storage device. The primary storage device includes a plurality of sections for storing data. Please refer to FIG. 2A. FIG. 2A shows the flow chart of this managing method.

In this preferred embodiment, step S21 is first performed to judge whether the primary storage device conforms to a first standard. Once the judging result of step S21 is NO, step S22 is performed to replaces the primary storage device with the spare storage device. Step S23 includes scanning the primary storage device, checking which sections are failed in the primary storage device, and locating the failed sections. Step S24 is checking whether the failed sections located in step S23 can be repaired. If there is any failed sections can be repaired that can be repaired, step S24 also repairs the failed sections that can be repaired. Step S25 is judging whether the primary storage device conforms to a second standard. If the judging result of step S25 is YES, step S26 is performed to set the primary storage device as a new spare storage device. If the judging result of step S25 is NO, step S27 is performed to set the primary storage device as failed storage device.

Figure 2B:
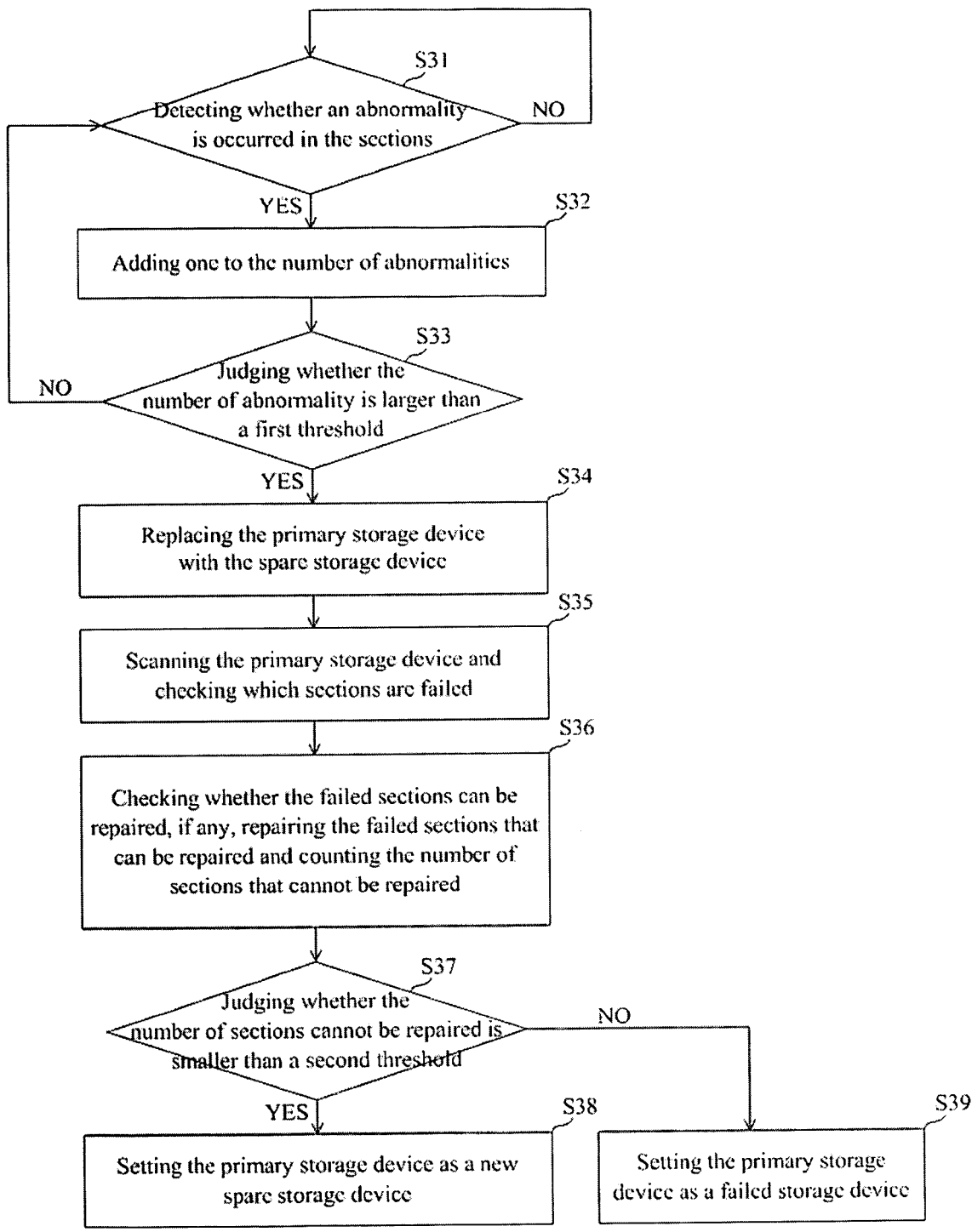
FIG. 2B is a detailed embodiment of the second preferred embodiment shown in FIG. 2A.

FIG. 2B shows a detailed example of the aforementioned managing method. Step S31 is first performed to detect whether an abnormality occurs in any section of the primary storage device. If there is any abnormality, step S32 is performed to add one to the number of abnormalities. Step S33 is judging whether the number of abnormalities is larger than a first predetermined threshold. If the judging result of step S33 is NO, the method continuously performs step S31. If the judging result of step S33 is YES, the method performs step S34 to replace the primary storage device with the spare storage device. After the primary storage device is replaced with the spare storage device, step S35 then scans the primary storage device, checks which sections are failed in the primary storage device, and locates the failed sections. Step S36 is checking whether the failed sections located in step S35 can be repaired. If there is any failed sections can be repaired, step S36 also repairs the failed sections that can be repaired and counts the number of sections that cannot be repaired. Step S37 is judging whether the number of sections that cannot be repaired is smaller than a second predetermined threshold. If the judging result of step S37 is YES, step S38 is then performed to set the primary storage device as a new spare storage device. On the contrary, if the judging result of step S37 is NO, step S39 is then performed to set the primary storage device as a failed storage device.

As shown in the aforementioned embodiments, when the primary storage device in a data storage system has too many abnormalities, this invention can first replace the primary storage device with the spare storage device. Subsequently, the data storage system and the managing method thereof according to this invention scan try to repair the failed sections. If most sections in the primary storage device are still usable after being repaired, this invention sets the primary storage device as a new spare storage device instead of directly discarding the primary storage device. Thus, this invention can considerably reduce the resources and the maintenance fee for data storage systems. The data storage system and the managing method thereof according to this invention can also be used in data storage systems including a plurality of primary storage devices and a plurality of spare storage devices, for instance, redundant array of independent disks (RAIDs).

In comparison with prior arts, this invention balances the reliability and the maintenance fee of data storage systems with a simple managing method.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data storage system, comprising:
 a primary storage device comprising a plurality of sections for storing data;
 a spare storage device;
 a judging module for judging whether the primary storage device conforms to a first standard;

a replacing module operated by the judging module, once the judging result of the judging module is NO, the replacing module replacing the primary storage device with the spare storage device;

an examining module for scanning the primary storage device, checking which sections are failed in the primary storage device, and locating the failed sections; and a repairing module for checking whether the failed sections located by the examining module can be repaired, if any, the repairing module repairing the failed sections that can be repaired and then judging whether the primary storage device conforms to a second standard, if the primary storage device conforms to the second standard, the repairing module setting the primary storage device as a new spare storage device.

2. The data storage system of claim 1, wherein the judging module comprises:

a detecting unit for detecting whether an abnormality occurs in any section of the primary storage device;

a first counting unit for counting the number of abnormalities detected by the detecting unit; and a judging unit for judging whether number of abnormalities counted by the first counting unit is larger than a first predetermined threshold.

3. The data storage system of claim 1, wherein the repairing module comprises:

a second counting unit operated when the repairing module judges whether the primary storage device conforms to a second standard, the second counting unit counting the number of sections that cannot be repaired and judging whether the number of sections that cannot be repaired is smaller than a second predetermined threshold.

4. The data storage system of claim 1, wherein if the primary storage device does not conform to the second standard, the repairing module sets the primary storage device as a new spare storage device.

5. The data storage system of claim 1, wherein the judging module operates constantly or in response to a user command.

6. The data storage system of claim 1, wherein the replacing module replaces the primary storage device with the spare storage device by copying the data stored in the primary storage device into the spare storage device.

7. The data storage system of claim 1, wherein the primary storage device and the spare storage device are both disk drives.

8. A managing method for a data storage system, said data storage system comprising a primary storage device and a spare storage device, the primary storage device comprising a plurality of sections for storing data, the method comprising the steps of:

(a) judging whether the primary storage device conforms to a first standard;

(b) once the judging result of step (a) is NO, replacing the primary storage device with the spare storage device;

(c) scanning the primary storage device, checking which sections are failed in the primary storage device, and locating the failed sections; and (d) checking whether the failed sections located in step (c) can be repaired, if any, repairing the failed sections that can be repaired and then judging whether the primary storage device conforms to a second standard, if the primary storage device conforms to the second standard, setting the primary storage device as a new spare storage device.

9. The managing method of claim 8, wherein step (a) comprises the sub-steps:

(a1) detecting whether an abnormality occurs in any section of the primary storage device;

(a2) counting the number of abnormalities detected in sub-step (a1); and (a3) judging whether number of abnormalities counted in sub-step (a2) is larger than a first predetermined threshold.

10. The managing method of claim 8, wherein in step (d), when judging whether the primary storage device conforms to a second standard, the following sub-step is performed:

(d1) counting the number of sections that cannot be repaired and judging whether the number of sections that cannot be repaired is smaller than a second predetermined threshold.

11. The managing method of claim 8, wherein if the primary storage device does not conform to the second standard, the primary storage device is set as a failed storage device.

12. The managing method of claim 8, wherein step (a) is performed constantly or in response to a user command.

13. The managing method of claim 8, wherein in step (b), the primary storage device is replaced with the spare storage device by copying the data stored in the primary storage device into the spare storage device.

14. The managing method of claim 8, wherein the primary storage device and the spare storage device are both disk drives.

* * * * *